3,241,926
APPARATUS FOR CONTINUOUSLY POLYCONDENSING POLYMETHYLENE GLYCOL ESTERS OF AROMATIC DICARBOXYLIC ACIDS
Wesley A. Parker, Knoxville, Tenn., and John E. Tate, Pensacola, Fla., assignors to Monsanto Company, a corporation of Delaware
Filed Nov. 15, 1963, Ser. No. 323,998
2 Claims. (Cl. 23—283)

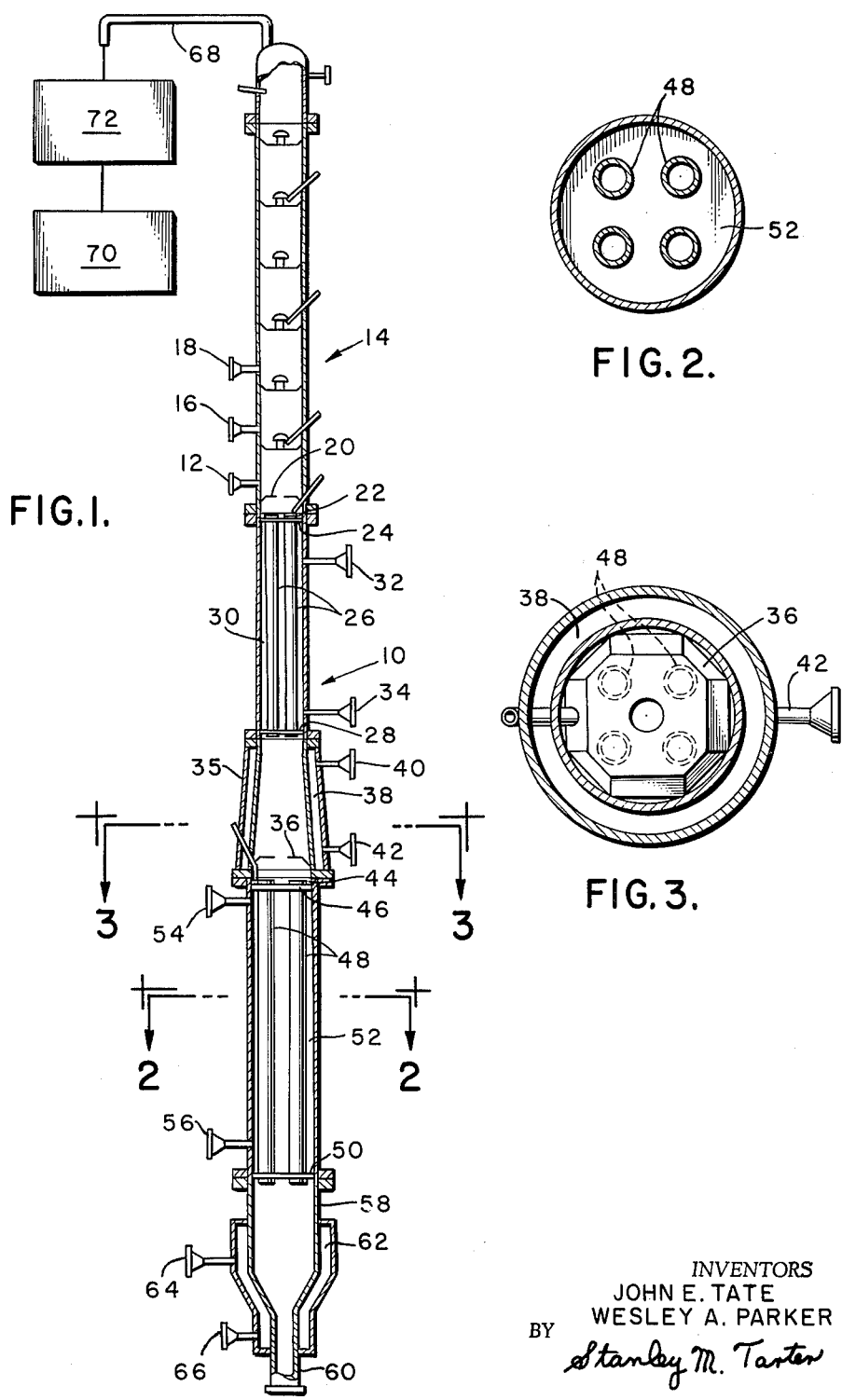

This application is a continuation-in-part application of application Ser. No. 168,496, filed Jan. 24, 1962, now U.S. Patent No. 3,167,531.

This invention relates to the manufacture of polymer of glycol esters of dicarboxylic acids. More particularly, the present invention relates to apparatus for the continuous manufacture of low molecular weight polymers of certain polymethylene glycol esters of certain aromatic dicarboxylic acids capable of being further polycondensed into highly polymeric polyesters exhibiting film- and fiber-forming properties.

It is known to produce polymeric esters by heating together under prescribed conditions dihydric alcohols or functional derivatives thereof and dibasic carboxylic acids or polyester-forming derivatives thereof. Such polyesters when highly polymerized can be formed into films, fibers and the like. A widely known polyester is polymeric ethylene terephthalate. The most commonly used process for the production of this specific polymer involves carrying out an ester interchange between ethylene glycol and dimethyl terephthalate and then polymerizing the resultant glycol esters by evolution of ethylene glycol under reduced pressure at an elevated temperature.

It has long been known that polymeric polymethylene terephthalates, of which polymeric ethylene terephthalate is a specific member, are not readily permeable to water; and accordingly, they cannot be satisfactorily dyed by ordinary dyeing procedures used in dyeing cotton, wool, natural silk, and regenerated cellulose. In recent times it has become known that the molecular structure of polymeric polymethylene terephthalate can be modified so greatly that one produced a distinctly different family of polymers having vastly improved dyeing properties. The modification is accomplished by including in ordinary polyester-forming reactants small but significant amounts of certain additives that become an integral part of the molecules constituting the polymers. Several such modifiers are mentioned hereinbelow. Specifically, it has been recently disclosed that various chain-terminating agents, for example, methoxypolyethylene glycol, can be polymerized with a saturated alkylene glycol and an aromatic dicarboxylic acid to produce fiber-forming polyesters having increased dye affinity. When such chain-terminating agents are used in the formation of polyesters, it is known that one can further enhance the properties of the modified polyesters by incorporating a small but significant amount of a chain-branching agent or cross-linking agent, for example, pentaerythritol, in the polyester reaction mixture. The chain-branching agent allows the introduction into the polyester molecule of the necessary amount of chain-terminator without the reduction in molecular weight encountered when like amounts of chain-terminators are employed in the polyester reaction mixture without the chain-branching agents.

While the use of the above-mentioned modifying agents in a polyester reaction mixture including saturated alkylene glycols and aromatic dicarboxylic acids represents a notable advance in the art, known apparatus for continuously producing polymeric polymethylene terephthalate cannot be used propitiously because the time of process holdup of the reactants therein is longer than would be desired. Because of this slow rate, it has been found that undesirable products, such as diethylene glycol, higher polymeric glycols, and other by-products of the main reaction are produced, all of which tend to lower the quality of the resulting polyester. The formation of these by-products is more pronounced when polyesters having chain-branching and chain-terminating moieties as part of the molecular structure are produced.

It is an object of the present invention to provide a new and useful apparatus for continuously polycondensing polymethylene glycol esters of aromatic dicarboxylic acids into low molecular weight polymers thereof.

Another object of the present invention is to provide a new and useful apparatus for continuously polycondensing polymethylene glycol esters of aromatic dicarboxylic acids into low molecular weight polymers thereof in the presence of polymer modifying agents, such as chain-terminating agents and chain-linking agents.

Other objects may become apparent from the following detailed description.

The invention provides a continuous flow type polyesterification apparatus for polycondensing polymethylene glycol esters of aromatic dicarboxylic acids into low molecular weight polymers thereof. The apparatus comprises in combination an elongated reaction column having inlet means at one end thereof for continuously supplying the ester reactants in liquid form to the column and outlet means at the other end of said column for continuously withdrawing the resulting low molecular weight polyester therefrom. Preferably, the reaction column is vertically elongated with the inlet means being located near the top end thereof and with the outlet means being located near the bottom end thereof. Between the inlet means and outlet means, at least one tube or like means forms the ester reactants moving therebetween into at least one annular thin film. Means are provided for heating this film and vacuum producing means are provided for subjecting the film to subatmospheric pressure to induce polycondensation of the esters.

Weir means are employed for conducting the ester from the inlet means to the top end of the tube where the esters flows downwardly therein. It is preferred that at least one second tube be tandemly arranged with respect to the first tube and be positioned between the first tube and the outlet means. In such case, it is best that a second weir means be employed for conducting the ester reactants discharged from the bottom end of the first tube to the top end of the second tube where the reactants normally flow downwardly therethrough in the form of a second annular thin film. In order to increase the throughput rate, a first plurality of parallel tubes can be used in tandem arrangement with a second plurality of tubes with the result that several annular thin films are formed at the same time. The apparatus also includes a first baffle between the inlet means and the first weir for diverting the reactants into this weir. In addition a second baffle can be positioned between the bottom ends of the first tubes and the second weir for diverting the reactants into the second weir. A distillation column normally will be placed between the vacuum producing means and the reaction column for better separating glycol evolved from the polycondensation reaction.

First, bis(hydroxyalkyl) aromatic carboxylate is prepared in a known manner for the continuous operation herein described. To do this, dimethyl terephthalate or other suitable lower dialkyl ester of terephthalic acid can be heated to the liquid phase. The minimum temperature to which the dimethyl terephthalate is heated will be a temperature sufficient to melt same. The maximum temperature will be below that at which degradation of the dimethyl terephthalate occurs to an appreciable extent. However, a temperature of the order of about 142 to 152° C. is preferred. Ethylene glycol or other suitable polymethylene glycol is supplied from a source and is fed to an ester-interchange zone separately from the molten dimethyl terephthalate being fed to such zone. On the way to the zone the glycol normally will be preheated, preferably to the temperature of 140 to 180° C. While it is preferred to preheat the glycol so that the ester-interchange reaction proceeds in an advantageous manner, it is not essential to do so. Neither is it critical to feed the glycol to the zone separately from the dimethyl terephthalate. These reactants can be premixed, but transesterification before the reactants reach the zone ought to be limited for best results. Generally, it is desirable to initiate the reaction by adding a large excess of glycol. After equilibrium conditions have been established in the reaction zone, a molar ratio of ethylene glycol to dimethyl terephthalate of 2.0:1 to 4.0:1, and preferably of about 3.8:1, is employed. If desired, a transesterification catalyst and polymer modifying additives may accompany the reactants to the zone or may be added separately to the zone.

The lower dialkyl esters of aromatic acids which can be used include those having the following general formula:

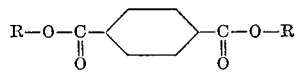

wherein R is an alkyl group containing 1 to 8 carbon atoms. Of these esters, dimethyl terephthalate is preferred in view of its commercial availability at a relatively low cost and in view of the desirable properties in the resultant polymer.

The polymethylene glycols which can be used have the following general formula:

$$HO(CH_2)_nOH$$

wherein $n$ is an integer of 2 to about 10. Of these glycols, ethylene glycol is preferred in view of its commercial availability at a relatively low cost and in view of the desirable properties in the resultant polymers.

Copolyesters can also be prepared in accordance with the present invention. For example, up to 25 weight percent or more of dialkyl esters of aromatic dicarboxylic acids not coming within the above general formula can be used in the reaction mixture. These include suitable esters of such acids as isophthalic acid; xylidinic acid; 2,6-dicarboxy naphthalene; 3,7-dicarboxy naphthalene; and the like. It is necessary that the reactive groups of the acid used in the copolyesters be two carboxyl groups. Therefore, the invention also includes processes for making copolyesters wherein part of the dialkyl esters of aromatic dicarboxylic acid is replaced with polyester-forming derivatives of aliphatic dicarboxylic acids, such as succinic acid, adipic acid, sebacic acid, 1,20-eicosanedioic acid, and the like.

A suitable transesterification catalyst normally will be employed, since in the absence of a catalyst the reaction normally proceeds at an undesirably slow rate. Zinc acetylacetonate and zinc acetate have been found to be particularly useful as catalysts for this process. Other suitable catalysts include, for example, litharge, alkali metals and their hydrides and certain compounds of certain metals, such as calcium, zinc, lanthanum, manganese, and cobalt, which are known in the art as being useful for catalyzing the ester-interchange reaction between polymethylene glycol and dialkyl terephthalate.

It has been found advantageous to incorporate in the initial carboxylate-forming reactants certain materials that form an integral part of the molecular chain and modify the properties of the ultimte polymer, for example, in regard to dye receptivity. Such modifying materials include those aromatic compounds which in addition to possessing two functional or reactive groups such as hydroxyl, carboxyl, or esters thereof, also possess a sulfinic acid group, salts, or ester thereof, a sulfonamide group, or other sulfonic acid derivatives which under the conditions employed in dyeing polyesters with basic dyestuffs revert to sulfonic acid or a salt thereof. Other modifying additives include certain monohydric polyalkylene oxides and hydroxyl polyalkylvinyl esters, preferably having a terminal hydroxy group. Additional additives that may be employed to modify the polyesters are the polyols which have a functionality greater than two, that is, they function as chain-linking agents and contain more than two functional groups as hydroxy or esters thereof such as in pentaerythritol.

The reaction product of the ester-interchange zone composed of bis(hydroxyalkyl) terephthalate or the like, excess glycol, and modifiers if added, is caused to flow continuously to and through the precondensation zone provided by the apparatus of the present invention where oligomers of polymethylene terephthalate are formed with the liberation of glycol. In particular, the reaction product is moved in a thin film or films in contact with a heated surface to maintain the required condensation temperatures. To facilitate removal of glycol subatmospheric pressure will normally be employed. Preferably, in the precondensation zone the material is flowed into a plurality of successive films, each being heated to a higher temperature than the film preceding it. For example, when dimethyl terephthalate and ethylene glycol are the initial major reactants, the reaction product is caused to move in a first film heated to about 180–210° C. The process pressure on this first film is maintained at about 90–760 mm. of Hg absolute, preferably about 460–500 mm. of Hg absolute. Under these conditions ethylene glycol is removed in 1–10 minutes, normally 2–3 minutes. For economic reasons provisions are made to recover and reuse the glycol.

Next, the reaction product is caused to move in a second film heated to about 240–280° C., preferably about 272–278° C., these temperatures applying when dimethyl terephthalate and ethylene glycol are the initial major reactants. The process pressure on the second film may be the same to which the first film is subjected. Polymethylene terephthalate with a degree of polymerization of about 8–16 and glycol are produced in about 1–10 minutes, normally 4–6 minutes, these times applying when dimethyl terephthalate and ethylene glycol are the initial major reactants.

As indicated above, the product of the second falling film is polymethylene terephthalate with 8–16 degrees of polymerization. It has a melting point of 238–242° C. when polymeric ethylene terephthalate is the product and exhibits excellent color. The low molecular weight polymer is readily polymerizable to condensation polymers having specific viscosities in the order of 0.2 to 0.6. This represents the fiber- and film-forming polymer.

The accompanying drawing illustrates a preferred embodiment of the invention wherein:

FIGURE 1 is an elevational schematic view partly in section showing one arrangement of the apparatus;

FIGURE 2 is an enlarged sectional view taken along line 2—2 of FIGURE 1 showing the arrangement of the lower tubes, and FIGURE 3 is an enlarged sectional view taken along line 3—3 of FIGURE 1 showing the arrangement of the lower baffle.

As shown in the drawing, the polyester-forming reactants enter vertically elongated reaction column 10 in predetermined amounts and rates at the top thereof by means of feed line 12. Above this column a distillation column 14 is attached. As illustrated, this second column is of a standard bubble-cap type which facilitates separation of glycol resulting from the polycondensation and any excess glycol accompanying the polyester-forming reactants to the apparatus. Alternate feed lines 16 and 18 can be provided for bringing the reactants into either of the two lower trays in column 14.

A first baffle 20 is suitably supported within the apparatus for gently diverting the incoming reactants into the reservoir or weir 22 provided by plate 24 and the inside wall of column 14. The liquid lever in this weir builds up and the reactants fall in the form of a plurality of thin films down through first tubes 26 which are fixedly mounted. The upper ends of the tubes protrude beyond plate 24.

Plate 28, together with the inside walls of column 14 and plate 24, provides a heating shell 30 around tubes 26. To heat the films moving down the tubes a heated fluid enters line 32, moves in heat exchanging relation with the tubes and exits through line 34. The polyester reactants fall through the conical section 35 of reactor 10 onto a lower baffle 36. A heating shell 38 for maintaining the required temperature of the reactants is provided. Heated fluid flows into the shell through line 40 and therefrom through line 42.

Lower baffle 36 causes the films falling from the upper tubes to divert and accumulate in lower reservoir or weir 44 provided by plate 46 and the inside walls of column 10. The liquid level in the weir builds up and the reactants fall in the form of a second plurality of thin films down second tubes 48 which are fixedly mounted. Plate 50, together with the inside walls of column 10 and plate 46, provides a heating shell 52 for tubes 48. To heat the second series of films a heated fluid enters line 54, moves in heat exchanging relation, and exits through line 56. Lower compartment 58 causes the films falling from the lower tubes to converge and flow to product lines 60. A heating shell 62 for maintaining the required temperature of the low molecular weight polyester is provided. Heated fluid flows into the shell through line 64 and therefrom through line 66.

The polyester leaving the apparatus through line 60 can be used as a coating material or for other useful purposes. To be used as a fiber- or film-forming material the polyester normally will have to be further polymerized. Although heated fluids have been illustrated for maintaining the reactants at the required elevated temperatures, other types of heaters can be employed. While it is not illustrated, the apparatus normally will be covered with insulating material to minimize heat loss.

As indicated above glycol is separated from the product as a vapor. Column 14 is used to facilitate this separation. Conduit line 68 at the top of this column is connected to vacuum producing equipment 70 through a condenser 72.

The invention is further illustrated by the following exemplary example in which the process is carried out in an apparatus of the type shown in the drawing. All parts and percentages are on a weight basis unless otherwise indicated.

EXAMPLE

To a melt tank 10.1 parts per hour of dimethyl terephthalate were supplied. At atmospheric pressure the dimethyl terephthalate was heated at 140° C. and stirred until it melted. The melt was transferred to the feed tank to which 0.0089 part zinc acetate catalyst per hour was supplied. The resulting mixture was metered into an ester interchange column packed with Raschig rings at the same rate at which the materials were supplied to the melt tank. The temperature of the melt as it entered the column was 142° C.

Ethylene glycol was heated to 140° C. and metered into the ester interchange column at the rate of 12.0 parts per hour simultaneously with the dimethyl terephthalate melt. 0.606 part methoxypolyethylene glycol (M.W.=2000) per hour and 0.0125 part of pentaerythritol per hour were metered into the ethylene glycol stream moving to the column. Methanol at a rate of 3.33 parts per hour was condensed from the vapors removed overhead from the column. The column was operated at atmospheric pressure and was heated peripherally so that the bottom product had a temperature of 180° C. The holdup time in the column was about 24 minutes. The bottom product was continuously moved to the precondensation column 10. The operating pressure in this column was 480 mm. of Hg. The reactants were heated by the two tube and shell heat exchangers of the type shown in the drawing so that the film leaving the second exchanger had a temperature of 260° C. Ethylene glycol was removed overhead as a vapor and condensed. The bottom product of the precondensation column was a modified polyethylene terephthalate having an average degree of polymerization of 12. Product holdup time was 3 minutes on the first exchanger and 5 minutes on the second exchanger. The bottom product of the precondensation column was further polymerized in a screw finisher at 275° C. and at an absolute pressure of one mm. of Hg. The product of the finisher was extruded through a spinneret according to a conventional melt spinning procedure to produce filaments of excellent textile quality.

The present invention affords numerous advantages over the prior art processes. The present apparatus has no moving parts and significantly reduces the time required to produce polymeric polymethylene terephthalate and the like and particularly to produce a low molecular weight ethylene terephthalate of 8–16 degrees of polymerization. Objectionable side reactions producing diethylene glycol and higher polyglycols are reduced. The resulting polymer is purer and exhibits reduced degradation products. The apparatus allows the use of modifying additives which would tend to degrade when held for the longer periods of time required by the prior art processes.

It is to be understood that changes and variations may be made without departing from the spirit and scope of the invention as defined in the appended claims.

What is claimed is:

1. Apparatus for continuously polycondensing polymethylene glycol esters of aromatic dicarboxylic acids into low molecular weight polymers thereof, comprising:
   (a) a vertically elongated reaction column;
   (b) inlet means at the top end of said reaction column for continuously supplying a liquid polymethylene glycol ester of an aromatic dicarboxylic acid to said column;
   (c) outlet means at the bottom end of said reaction column for continuously withdrawing the resulting low molecular weight polymer therefrom;
   (d) a first plurality of parallel arranged elongated tubes axially disposed in said column below said inlet means;
   (e) a second plurality of parallel arranged elongated tubes tandemly disposed with respect to said first tubes and positioned between said first tubes and said outlet means;
   (f) a first weir means for conducting said ester from said inlet means to the top ends of said first tubes where said ester normally flows downwardly therein in the form of a first plurality of annular thin films;
   (g) a second weir means for conducting the ester discharged from the bottom ends of said first tubes to the top ends of said second tubes where said ester normally flows downwardly therein in the form of a second plurality of annular thin films;

(h) a first baffle between said inlet means and said first weir for diverting the ester into said first weir;
(i) a second baffle between the bottom ends of said first tubes and said second weir for diverting the ester into said second weir;
(j) means for heating said films;
(k) vacuum producing means for subjecting said films to subatmospheric pressure; and
(l) a distillation column connected to and communicating with said vacuum producing means and said reaction column for separating glycol resulting from the polycondensation.

2. The apparatus of claim 1 wherein said distillation column is a bubble-cap type.

References Cited by the Examiner
UNITED STATES PATENTS

| | | | |
|---|---|---|---|
| 891,896 | 6/1908 | Acker | 23—283 X |
| 3,192,184 | 6/1965 | Brill et al. | 260—75 |

MORRIS O. WOLK, *Primary Examiner.*

JAMES H. TAYMAN, Jr., JOSEPH SCOVRONEK,
*Examiners.*